United States Patent [19]

Groth

[11] 4,096,915

[45] Jun. 27, 1978

[54] GROUND WORKING APPARATUS WITH TOOLS TO DRAW THE APPARATUS FORWARD

[75] Inventor: Hugh F. Groth, Brecksville, Ohio

[73] Assignee: True Temper Corporation, Cleveland, Ohio

[21] Appl. No.: 786,479

[22] Filed: Apr. 11, 1977

[51] Int. Cl.² ................. A01B 33/00; A01B 39/06
[52] U.S. Cl. .............................. 172/42; 172/84; 172/116
[58] Field of Search ............ 172/21, 22, 42, 43, 172/57, 80, 84, 86, 88, 93, 95, 97, 101, 116, 123, 125, 394; 56/247, 362, 363, 504

[56] References Cited

U.S. PATENT DOCUMENTS

| 302,393 | 7/1884 | Gillet | 172/84 |
|---|---|---|---|
| 1,205,342 | 11/1916 | Glass | 172/116 |
| 1,228,992 | 6/1917 | Ullman | 172/43 |
| 1,624,610 | 4/1927 | Matson | 172/84 |
| 3,204,704 | 9/1965 | Goette | 172/42 X |

FOREIGN PATENT DOCUMENTS

| 76,508 | 4/1948 | Czechoslovakia | 172/42 |
|---|---|---|---|
| 465,131 | 9/1928 | Germany | 172/84 |
| 390,209 | 2/1924 | Germany | 172/42 |
| 610,266 | 10/1960 | Italy | 172/42 |

Primary Examiner—Richard T. Stouffer
Attorney, Agent, or Firm—J. H. Slough

[57] ABSTRACT

A cordless earth tiller has a housing mounted upon wheels and including a handle for guiding and controlling the tiller and tilting the same in a fore-and-aft direction. A power driven crankshaft disposed forwardly of the wheels carries a plurality of arms which depend from crankpins of the crankshaft and are provided at their lower ends with tines. Links are pivotally connected at one end to the arms and at the other end to an axle of the wheels whereby rotation of the crankshaft causes a tilling or cultivating motion of the tines. The tines sequentially impinge upon the ground in a substantially vertical direction and proceed through the ground at a rearward inclination to draw the tiller through the ground in response to rotation of the crankshaft. Modifications comprise the use of harrowing disks as wheels and the substitution of ice chipping tools for the tines, etc.

12 Claims, 11 Drawing Figures

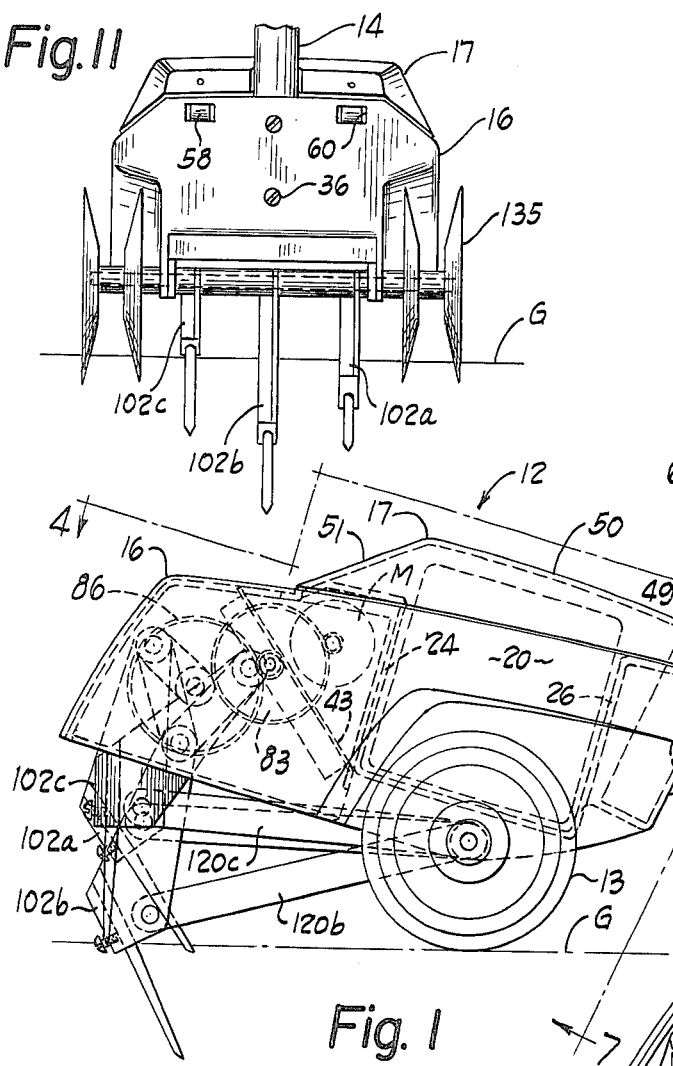
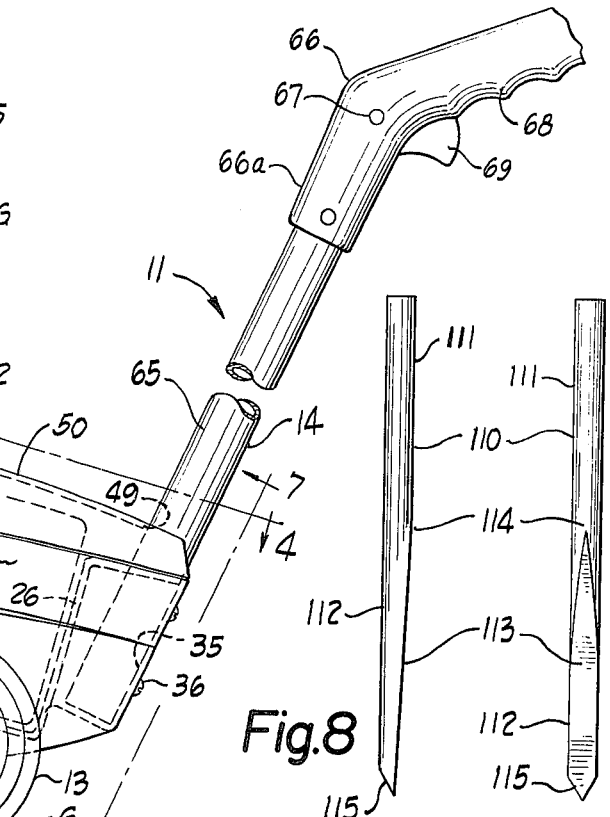
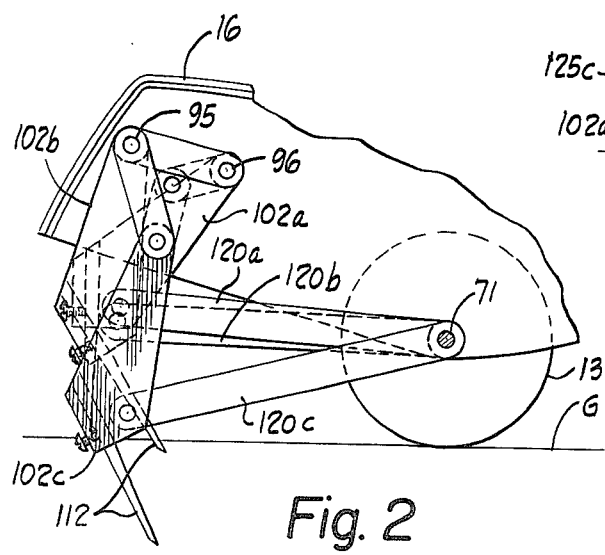
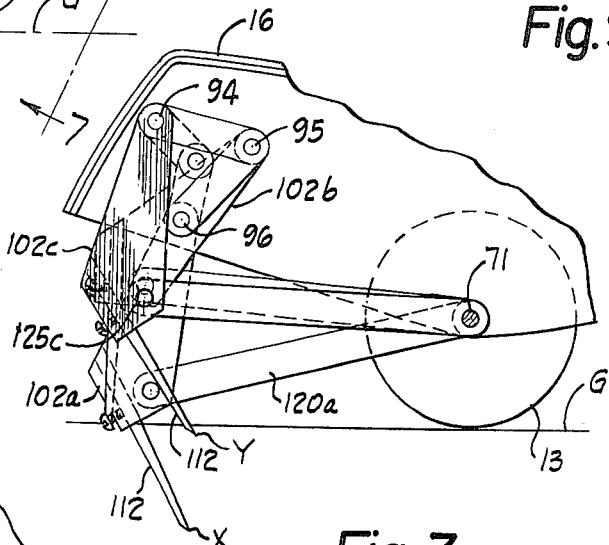

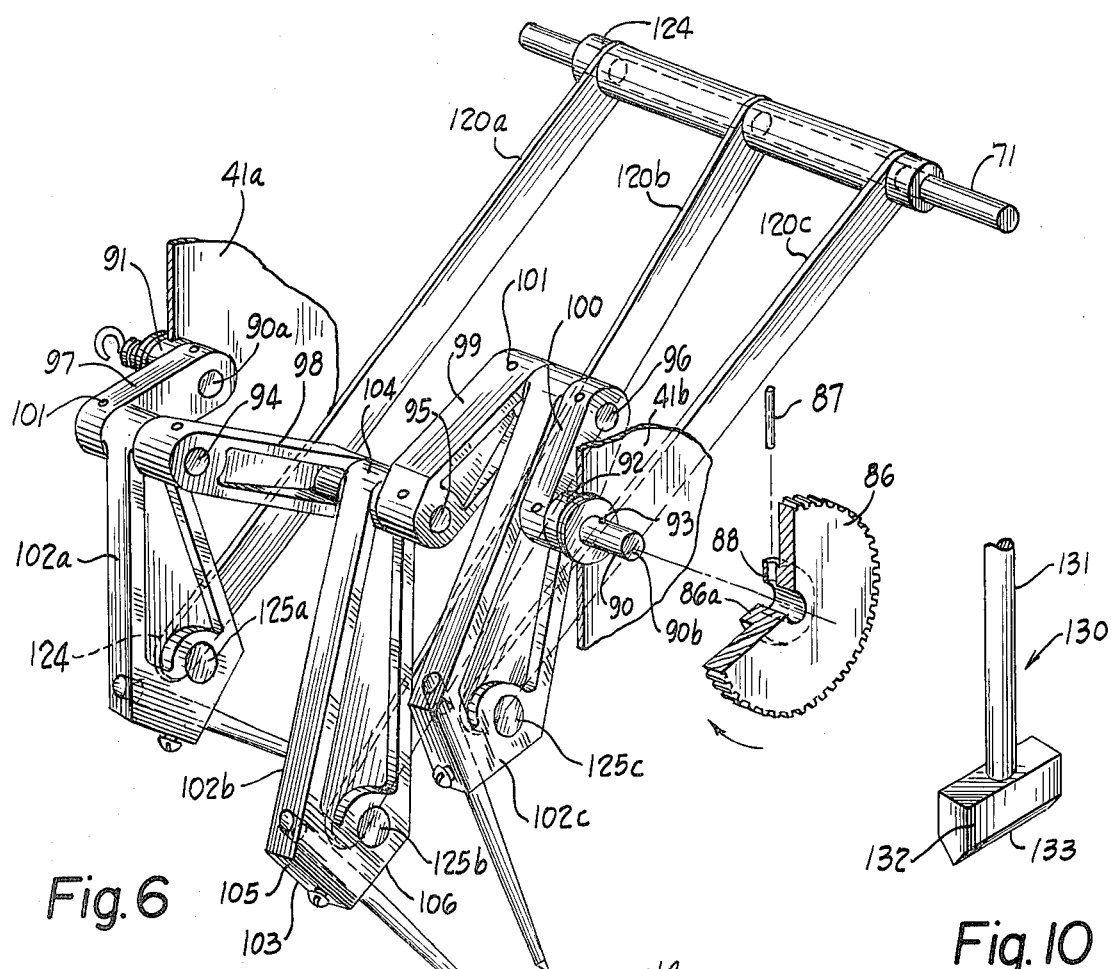
Fig. 6
Fig. 10
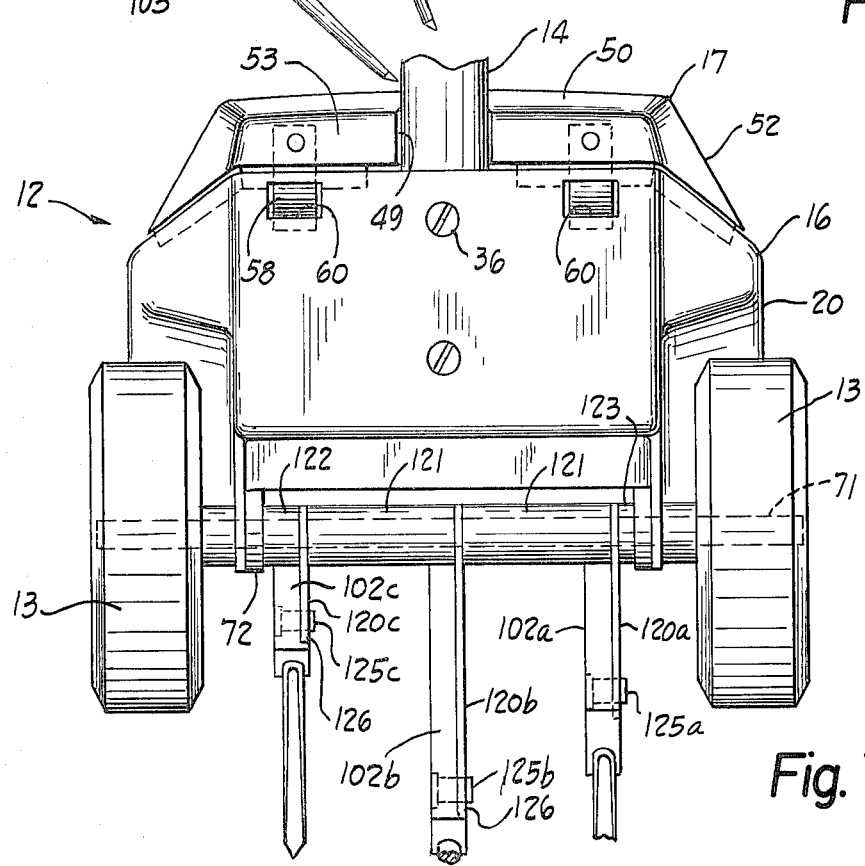
Fig. 7

GROUND WORKING APPARATUS WITH TOOLS TO DRAW THE APPARATUS FORWARD

This invention relates to earth tilling and cultivating machines and particularly to a small, hand-manipulated power tiller for use in small gardens, flower beds, and the like.

Cultivating and tilling machines are generally large and heavy, present some difficulty for the average person to operate, and are too expensive and unnecessarily complicated for small gardening efforts. Examples of the type of machines referred to are found in U.S. Pat. Nos. 3,204,703 issued to R. E. Hansen, Sept. 7, 1965 and 2,849,939 issued to J. E. Montgomery, Jr., Sept. 2, 1958. The Hansen patent discloses an apparatus which compresses a coil spring and then releases it to drive the prongs of a fork vertically into the ground for subsurface cultivation without greatly disturbing the surface layer of soil. This is effected by removing the prongs at an angle through substantially the same holes caused by their penetration. Montgomery, Jr. discloses a soil aerator in which spikes mounted on endless belts are pressed into and retracted from the earth in a substantially vertical position as the belts turn. The invention as herein disclosed provides a tiller in which a plurality of tines are sequentially caused to impinge upon the ground in tilling motions which propel the tiller forwardly, the operator of the tiller having complete control at all times over both the depth and the amount of cultivation and the amount of disturbance of the surface soil.

The present invention as herein disclosed comprises a small earth tilling machine which is provided with a pair of wheel means at the sides and an elongated handle enabling a person walking behind the machine to readily control the same by steering and by rocking it in the fore-and-aft direction. The power source comprises rechargeable batteries and an electric motor and transmission means for rotating a crankshaft having a plurality of arms depending from the crankpins thereof. Links connect the lower ends of the arms to the axle of the wheel means whereby the motion of the arms in response to rotation of the crankshaft is controlled. The lower end portions of the arms carry tines which move vertically to enter the earth, tilt forwardly, and move backwardly prior to withdrawal to create sequential clawing or raking motions which propel the tiller forwardly as the earth is cultivated. The wheel means may comprise either conventional wheels or harrowing disks, and the tines may be replaced with other tools such as tools for chipping ice or packed snow from the sidewalks or driveways, etc.

The general object of this invention is to provide an earth tiller which is especially adapted for small gardening efforts such as small vegetable gardens, flower beds, and the like.

Another object of this invention is to provide an earth tiller as set forth above having a mechanism providing optimum kinematics thereby requiring minimal driving torque and prolonging battery life.

Another object of the invention is to provide an earth tiller having the above characteristics wherein penetration and withdrawal of the tines causes minimal root destruction and eliminates winding roots on the tines.

Still another object of the invention is to provide an earth tiller as set forth above wherein the action of the tines does not tend to throw dirt.

Still another object of the invention is to provide an earth tiller of the type referred to which is self-propelled by the tilling action.

A still further object of the invention is to provide, in an earth tiller of the type referred to, means for adjusting the length of the tines with respect to the arms and also means for adjusting the depth of penetration of the tines during operation of the tiller.

Yet another object of the invention is to provide a cultivating action of the tines wherein the withdrawal of a tine at one part of the cycle assists in effecting penetration of another tine in another part of the cycle thereby tending to stabilize the tiller when in operation.

Other objects of the invention and the invention itself will be readily understood from the following description and the accompanying drawings, in which said drawings:

FIG. 1 is a side elevation of the earth tiller of this invention in one operating position, part of the handle being broken out;

FIG. 2 is a fragmentary side view showing the tiller in a second operating position;

FIG. 3 is a fragmentary side viewing showing the tiller in a third operating position;

FIG. 6 is a perspective view, partially exploded, of the linkage and ground engaging spikes in the same general operating position as FIG. 1 and drawn generally to the scale of FIGS. 4 and 5;

FIG. 7 is a rear elevation of the tiller as viewed from the line 7—7 of FIG. 5;

FIG. 8 is a further enlarged, side elevation of a ground engaging spike of the tiller;

FIG. 9 is a rear elevation of the spike of FIG. 8;

FIG. 10 is a perspective view of a chipping tool adapted to be used in place of the spike of FIGS. 8 and 9; and FIG. 11 is a rear view of a modified form of the earth tiller of this invention.

Figure 4:
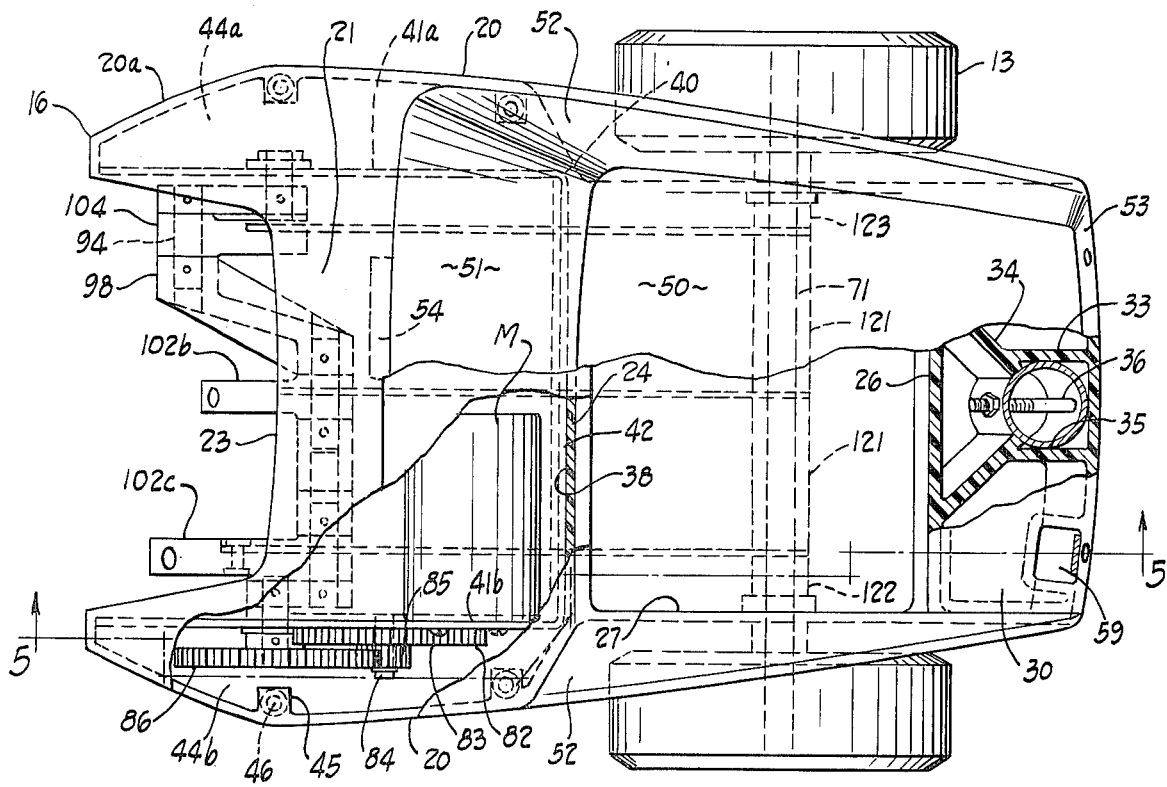
FIG. 4 is an enlarged section taken generally along the line 4—4 of FIG. 1 showing a top plan view of the tiller housing, partially broken away for clarity.

The earth tiller of this invention is generally indicated by the reference numeral 11 in FIG. 1. Said tiller comprises, in general, a housing 12 containing the tiller mechanism and power source therefore, a pair of ground engaging wheels, and an elongated, generally upright handle 14 for steering, rocking, and otherwise manipulating the tiller.

The housing 12 may be formed or manufactured of any suitable material such as metal or an impact resistant, hard plastic. Said housing may be manufactured and assembled in any suitable manner, and for the purpose of the present description will be treated as comprising two parts: a body 16 and a cover 17.

The body 16 comprises a pair of sidewalls 20 which are connected by an integral top wall 21. The forwardly directed edge 23 of said top wall is recessed rearwardly to expose a portion of the tilling mechanism between forwardly projecting portions 20a of said sidewalls. A vertical wall 24 is disposed a substantial distance rearwardly of the forward edge 23 and extends downwardly between the sidewalls 20 to a point spaced upwardly from the lower edge of said sidewalls. The bottom edge of the vertical wall 24 is connected to a rearwardly projecting, horizontal wall 25 the rearmost edge of which is connected to the bottom edge of a second, rearwardly disposed vertical wall 26. The walls 24, 25, and 26, in cooperation with portions of the sidewalls 20, provide an upwardly open compartment 27 for receiving a rechargeable battery package 28.

Rearwardly of the vertical wall 26 of the compartment 27, the housing 12 is provided with means providing a socket for receiving the lower end portion of the handle 14. As herein illustrated, substantially deep flanges 30 and 31 extend rearwardly from the rear vertical wall 26 between the rearmost portions of the sidewalls 20. The back of the body 16 is closed by a rear wall 32 thereby providing an enclosing structure just rearwardly of the compartment 27. As best seen in FIG. 4, the rear vertical wall 26 and the back wall 32 are connected by parallel wall portions 33 and intersecting angled wall portions 34 so arranged that said parallel wall portions and the ends of said angled wall portions provide a socket 35 for receiving the lowermost end portion of the handle 14. The lowermost end portion of said handle is secured within the socket 35 by any suitable means such as bolt and nut assemblies 36 which project through the backwall 32 and the handle 14.

Figure 5:
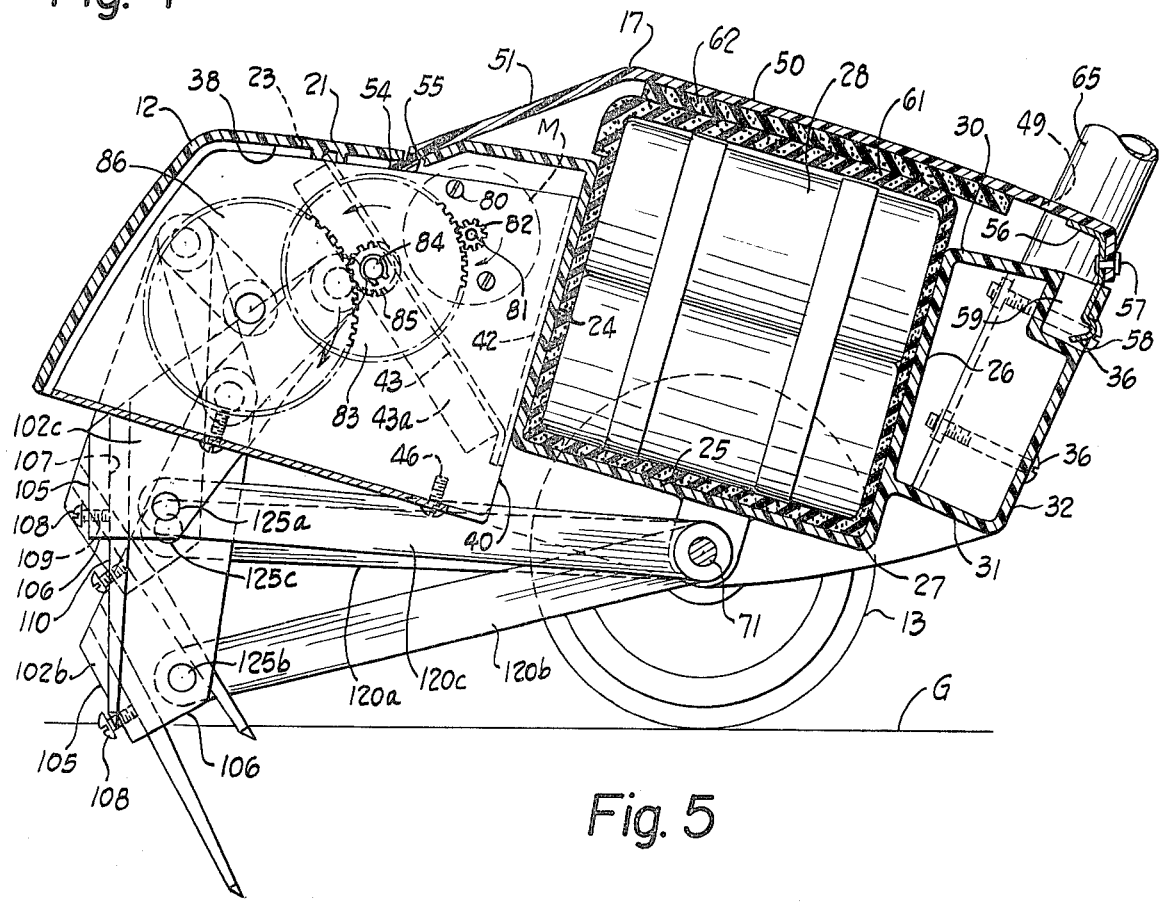
FIG. 5 is a section through the tiller housing taken generally along the line 5—5 of FIG. 4 and exposing the gear train.

Forwardly of the front vertical wall 24, the top wall 21 and the front portions of the sidewalls 20 provide a forwardly and downwardly open compartment 38 adapted to receive the motor, power train, and linkage of the tilling mechanism. As herein illustrated, the tilling mechanism is carried by a metal frame 40 which is adapted to be inserted upwardly into the foward compartment 38. The frame 40 comprises a pair of sidewalls 41a and 41b connected at their rearmost edges by a vertical wall 42. The sidewalls 41a and 41b are also connected together by an angled wall 43 which extends from adjacent to the bottom edge of the vertical wall 42 forwardly and upwardly to a point generally adjacent to the forward edge 23 of the top wall 21 in the assembled condition as shown in FIG. 5. The vertical wall 42 and the sidewalls 41a and 41b may be integrally formed from a single piece of heavy, flat sheet metal, and the angled wall 43 is provided at the side edges thereof with right angularly bent flanges 43a which are welded or otherwise suitably secured to the inner surfaces of the sidewalls 41a and 41b. The bottom edges of the sidewalls 41a and 41b are provided with laterally outwardly, right angularly bent flanges 44a and 44b, respectively, shaped to fit inside the sidewalls 20 and sidewall portions 20a when the frame is disposed within the forward compartment 38 with its vertical wall 42 disposed flatwise against the front vertical wall 24 of the body 16. Said body is preferably provided with inwardly projecting bosses 45 projecting inwardly from the inner surfaces of the side walls 20 and adapted to receive upwardly projecting bolts 46 which extend upwardly through suitable apertures in the flanges 44a and 44b and are screw-thread fitted into said bosses to hold the frame securely in place.

The cover 17 comprises a generally flat upper wall portion 50, a forwardly and downwardly tapering front wall portion 51, laterally, outwardly and downwardly tapering sidewall portions 52, and a downturned rear flange 53.

The forwardly disposed end of the front wall portion 51 is provided with a downwardly and forwardly stepped lip 54 adapted to be inserted into a slot 55 in the top wall 21 of the body 16. The lip and slot serves as a hinge whereby when the cover 15 is pivoted backwardly to the closed position shown in FIG. 5, the lip 54 is engaged under a portion of the top wall 21 to hold the front of the cover firmly in place.

The rear flange 53 of the cover 17 is generally aligned with the back wall 32 of the body 16 and is provided with a pair of spring fasteners 56 connected to the inside of the flange 53 on either side of the handle 14 by suitable means such as rivets 57. In the form herein illustrated, the spring fasteners are made of sheet spring metal, each spring fastener projecting a substantial distance below the rear flange 53 and having a rounded latch portion 58 at its lower end. The upper flange 30 of the body 16 is provided with a pair of upwardly open recesses 59 adjacent to the back wall 32, said recessed adapted to receive the spring fasteners 56 which are cammed inwardly of the upper edge of said back wall by means of the rounded latch portion 58 when the cover 17 is closed. The back wall 32 is provided with a pair of slots 60, best seen in FIG. 7, into which the latch portions 58 snap when the cover 17 is closed to hold said cover in the closed condition. Opening of said cover is easily effected by simply pulling up on the rear of the cover, the rounded latch portions 58 being so shaped as to cam the spring fasteners 56 inwardly of the recesses 59 in response to upward pressure. The cover 17 is provided with a suitable large notch 49 as its rearmost edge to afford clearance for the handle 14 when said cover is closed.

It will be noted particularly in FIG. 5 that the rechargeable battery package 28 is preferably wrapped in a suitable vibration absorbing padding 61 made of sponge rubber, foam plastic, or the like. The inner surface of the flat, upper wall portion 50 of the cover 17 may also be provided with a resilient pad 62 whereby closing of the cover secures the battery package 28 and dampens any vibration thereof.

The handle 14 comprises a preferably tubular shaft 65 to lower end portion of which is secured within the socket 35 by bolt and nut assemblies 36 in the manner hereinabove described. The shaft 65 is of sufficient length that a person operating the same can comfortably grasp an upper grip 66 having a socket portion 66a adapted to receive the upper end portion of the shaft 65. The grip 66 may be constructed in any suitable manner and is firmly secured to the upper end portion of the shaft 65 by suitable means such as rivets 67. Said grip is preferably of pistol grip style, comprising a manual grasping portion 68 affording ready access to a switch closing trigger 69. It will be understood that pulling the trigger 69 closes a switch in a well-known manner whereby to energize a motor M mounted within the forward compartment 38. The motor M drives the tilling mechanism in a manner herein later described in detail. Release of the trigger 69 automatically de-energizes the motor M and stops the tiller.

Referring now particularly to FIG. 7, the wheels 13 are suitably mounted upon an axle 71 which, in turn, is mounted in journals 72 disposed adjacent to the lower edges of the side walls 20 beneath the compartment 27 of the body 16. Thus the wheels are disposed toward the rear of the housing 12, the tilling mechanism being disposed forwardly thereof.

Referring now particularly to FIGS. 4 and 5, the motor M is secured at one end thereof to the inner surface of the frame side wall 41b by suitable means such as a pair of small bolts 80. Said motor comprises a drive shaft 81 which projects outwardly through a suitable opening in the side wall 41b, the outer end of said drive shaft having a pinion 82 mounted thereon. The pinion 82 engages a stepdown or reduction gear 83 rotatably mounted to the outside of the frame side wall 41b upon an idler shaft 84. The reduction gear 83 includes a reduced gear portion 85 which, in turn, engages a final driven gear 86. Referring particularly to FIG. 6, the driven gear 86 is securely mounted upon an outwardly projecting shaft portion 90b of a crankshaft 90, said crankshaft being mounted for rotation in the frame side walls 41a and 41b by shaft portion 90a and said shaft portion 90b disposed in suitable journals 91 and 92, respectively. The crankshaft 90 rotates with the driven gear 86 which may be secured to said crankshaft by any suitable means, such as a pin 87 projecting through an aperture 88 in a gear hub 86a and an aperture 93 in the crankshaft 90.

The crankshaft 90 has three crankpins 94, 95, and 96 spaced radially outwardly the same distance from the center line of said crankshaft and spaced rotatively 120° apart. A web 97 is disposed adjacent to the frame side wall 41a and extends between the shaft portion 90a and one end of the crankpin 94; a web 98 extends between the other end of the crankpin 94 and one end of the intermediate crankpin 95; a web 99 extends between the opposite end of the intermediate crankpin and one end of the crankpin 96; and a web 100 disposed adjacent to the frame side wall 41b extends between the opposite end of the crankpin 96 and the shaft portion 90b. It will be understood that the webs 97, 98, 99, and 100 are nonrotatively secured with respect to the shaft portions 90a and 90b and the crankpins 94, 95, and 96 by any suitable means such as pins 101.

The crank pins 94, 95, and 96 carry substantially identical pivoted arms 102a, 102b, and 102c, respectively. Each arm is generally wedge-shaped tapering from a wider, holder portion 103 to a relatively narrow bearing portion 104. Said crankpins project through the bearing portions 104 of the arms, the bearing portion of arm 102a being disposed between the webs 97 and 98, the bearing portion of arm 102b being disposed between webs 98 and 99, and the bearing portion of the arm 102c being disposed between webs 99 and 100. As herein disclosed, the webs 97 and 100 are straight and disposed parallel with frame sidewalls 41a and 41b respectively, whereas webs 98 and 99 are laterally angled in a direction parallel with the axis of the crankshaft 90 whereby said arms are disposed a substantial distance apart as best seen in FIGS. 4, 6, and 7.

Each holder portion 103 has right angularly disposed, converging edges 105 and 106 at the extreme end of the arm opposite to the bearing portion 104. As best seen in FIG. 5, each said arm has a through bore 107 disposed axially parallel with and spaced inwardly from the longer edge 105. A set screw 108 engages a threaded aperture 109 which extends through the longer edge 105 and intersects the through bore 107 at right angles.

The through bore 107 of each arm 102a, 102b, and 102c is adapted to receive a spike 110 shown in detail in FIGS. 8 and 9. Each spike 110 is made from a cylindrical bar comprising, in general, a shank 111 and tine 112. The tine 112 is formed by providing the round bar with a flat 113 which extends from the axis of the spike at one end to a point intermediate the ends of the spike where it terminates at the surface of the spike as indicated at 114. The distal end of the tooth 112 is provided with a semiconical end portion 115 whereby to provide a sharp, penetrating point for said tooth.

It will be clearly understood that the spikes 110 are mounted to the arms 102a, 102b and 102c by projecting the shanks 111 into the through bores 107 with the tines 112 projecting downwardly and then securing the spikes in place by tightening the set screws 108. The effective length of the tines 112 is subject to adjustment by moving shanks 111 axially within the through bores 107 until the desired tine length is obtained before tightening the set screws.

The arms 102a, 102b and 102c are connected to the axle 71 by means of elongated links 120a, 120b, and 120c, respectively. As herein illustrated, each link comprises a length of narrow, flat, heavy gage steel having apertured bearing portions 124 at either end. The links 120a, 120b, and 120c project forwardly from the axle 71 and have their front end portions pivotally connected to the holder portions 103 of the arms 102a, 102b, and 102c, respectively, by means of pivot pins 125a, 125b, and 125c. As best shown in FIG. 7, said arms are preferably provided with recesses 126 at the point of connection of the forward ends of the links whereby said links are recessed with respect to the sides of said arms. Said links are spaced across the axle 71 between the journals 72 for proper alignment with the arms by means of two relatively large tubular spacers 121 disposed between the arms and smaller end spacers 122 and 123, also of tubular form, disposed between the outermost arms 120a and 102c of the journals 72.

The arms 102a, 102b and 102c and the tines 112 are actuated to move vertically and impinge upon the ground in a digging and tilling action by the rotation of the crankshaft 90 and the limiting or restricting effect of the links 120a, 120b, and 120c which determines the motion which the holder portion 103 of each arm will take in response to the cranking motion of the crankshaft.

Referring now to FIG. 5 of the drawings, as therein viewed the drive shaft 81 and the pinion 82 of the motor M rotate clockwise, the reduction gear 83 and reduced gear portion 85 counterclockwise, and the driven gear 86 and crankshaft 90 clockwise. FIGS. 1 through 3 show three different operative positions of the crankshaft representing successive rotary movements of 120°. By successively locating the same arm in successive figures, the motion of each arm can be clearly understood. For example, in FIG. 1, arm 102c is shown at substantially the point of impingement with the ground level G when the tiller 11 is disposed at a normal operating angle. FIG. 2 shows the position of the arm 102c at substantially the point of full penetration after the crankshaft has rotated in the clockwise direction 120°. FIG. 3 shows the same arm substantially withdrawn from the ground G and within 120° of the original starting point in FIG. 1. Each arm 102a, 102b, and 102c performs the same motion, the motion of arm 102b following the motion of arm 102c by 120° and the motion of arm 102a following the motion of arm 102b by 120°.

It will be noted that each tine 112 attains a generally upright position just prior to its impingement upon or penetration of the ground G. As the pivoted bearing portion 104 moves from a position rearwardly of the crankshaft axis to a position forwardly thereof and upwardly toward the position of FIG. 3, the arm 102c is rocked forwardly at the lowest portion of its cycle about the pivot pin 125c thereby causing the associated tine 112 to be tilted forwardly and moved rearwardly in a raking motion. During this tilting motion, the tine 112 is sequentially driven into and withdrawn from the soil. This motion can be best understood by referring, for example, to FIG. 3 wherein the arm 102c is substantially withdrawn whereas the arm 102b, in the position previously occupied by arm 102c, is in almost its lowest position. Thus, in its rotation from the position of FIG. 2 to the position of FIG. 3, the tine of arm 102c would have moved from the position indicated at X to the position indicated at Y in FIG. 3. It can clearly be seen that the tooth 112 would thus not only begin to withdraw but would also be disposed an an increased forwardly tilted angle with respect to the ground G thereby providing a clawing action which could tend to pull the tiller 11 forwardly and at the same time rip upwardly in a churning or breaking action of the ground.

A further feature of the tilling action is that the withdrawal movement described above, wherein each tine is pulled upwardly at an oblique angle through the soil, causes a downward pull or bias on the forward end of the tiller 11 thereby assisting in the penetration of an impinging tine 112 that is in the downward moving part of the cycle. The sequential tendency of the teeth to both press against and pull out or claw the earth has a substantially stabilizing effect for the user as well as effectively breaking and pulverizing the soil.

The operator can determine the depth of the tilling or soil working action not only by adjusting the length of the tines 112, but more immediately by the simple means of tilting the handle 14 fore-and-aft. If said handle is tilted forwardly, the arms and teeth are pressed further into the ground for a deeper churning motion whereas if the handle is tilted backwardly, there is correspondingly less penetration. The ground level lines represented in FIGS. 1 through 3 represent substantially the maximum depth of penetration in moderately soft soil for most efficient use of the tiller. By confining the digging action to the tines 112 or portions thereof, the minimal driving torque is required thereby prolonging battery life and the life of the mechanism in general.

The flats 113 of the tines 112 are positioned to face rearwardly of the direction of tiller movement whereby to maximize the curning and breaking up of the soil as the tines move rearwardly and upwardly. It will be noted, however, that most of the clawing and ripping action takes place during maximum penetration and that as the tines are withdrawn, they stop the forward tilting motion or begin to tilt back toward the exact point at which a tine attains the upright position with respect to the Ground G will, of course, be affected by the angle at which the tiller 11 is operated. During normal operation, the angle of withdrawal of the tines will be such that it results in minimal root destruction and eliminates winding the roots on the teeth. However, the operator can locate the above described churning and breaking action at or near the surface of the ground by tilting the handle 14 backwards to raise the front of the housing 12. The operator can also increase the amount of cultivation at a given point by holding back on the tiller and limiting its forward motion whereby the tilling action is prolonged at any given spot. If less tilling is desired, the operator need only push the tiller faster than the tilling action would normally propel it.

The length adjustment of the tines 112 can be utilized not only to effect greater or lesser penetration of the soil but also as a compensating feature where either greater or lesser torque is needed or greater or lesser torque is available. The tines can be shortened for use with a lower powered model of the tiller or where a tiller of a given power encounters harder and more difficult soil. Because of the particular kinematics of the mechanism, the tiller of this invention does not throw the soil as it tills.

From the foregoing it will be seen that the present invention provides a tiller which is at all times under the control of the operator for cultivating soil to the depth chosen. The tiller is self-propelling and this also can be controlled by the operator by tilting the tiller either forwardly or backwardly and by squeezing or releasing the trigger 69. Although the tiller of the present invention discloses only 3 working arms and teeth, it will be readily understood that it need not be limited to that number.

Referring now to FIG. 11, it is anticipated that the wheels 13 may be replaced by harrowing disks 135 whereby disking takes place at the same time as the tilling or cultivating action of the tines. In so modifying the tiller 11, the disks 135 become wheel means for the tiller. It is further anticipated that the present invention may be utilized for other ground working jobs by replacing the spikes 112 with other tools. For example, FIG. 10 illustrates an ice-chipping tool generally indicated at 130 and comprising a shank 131 having an ice-chipping work portion 132. The work portion 132 preferably comprises a bar of metal having a chisel-shaped lower edge 133 made of hardened steel and adapted for chipping ice and hard-packed snow by repeatedly impinging thereupon. Tools 130 can be mounted in the same manner as the spikes 110 by inserting the shanks 131 within the through bores 107 of the arms 102a, 102b, and 102c. The chisel edges 133 are preferably disposed laterally or transversely of the direction of travel. It will be readily understood that the tool 130 does not exhaust all alternate possibilities to substitute tools which may be used in the tiller in the place of the spikes 110.

In the following claims, it will be understood that "ground working" and "work said ground" refer to any use of the tiller of this invention for causing tools to impinge upon a surface for cultivating, breaking, chipping, or similar purposes. It will be further understood that "wheel means" refers to any construction adapting the tiller for propulsion whether the same be conventional wheels, harrowing disks, or equivalent means. "Impinge" refers to striking the ground whether or not the ground is penetrated.

It will be understood that many changes in the details of the invention as herein described and illustrated may be made without, however, departing from the spirit thereof or the scope of the appended claims.

What I claim is:

1. A ground working apparatus comprising:
   support means having a forward portion and a rearward portion;
   guide means connected to said support means for guiding and controlling the apparatus;
   crankshaft means mounted on said support means for rotation about an axis generally parallel with the ground;
   power transmission means for rotating said crankshaft means about the axis of rotation;
   an axle disposed rearwardly of said crankshaft means and being generally parallel to the axis of rotation of said crankshaft means;
   a pair of wheels rotatably mounted at opposite ends of said axle for transporting the apparatus over the ground;
   at least three crankpins;

web means supporting said crankpins parallel with and angularly spaced about the axis of rotation of said crankshaft means and rotating said crankpins about said axis in response to rotation of said crankshaft;

at least three tool support arms each including a bearing end pivotally mounted on one of said crankpins and a tool supporting end extending toward the ground;

at least three elongated ground working tools, each connected to a tool supporting end of a respective tool support arm and disposed between said wheels at the forward portion of said support means, said tools having generally pointed ground impinging distal end portions; and link means located between said wheels and pivotally secured to said tool support arms and to said axle for restricting said tool support arms to paths of movement wherein the ground working tools sequentially impinge upon the ground in a substantially vertical direction and proceed through the ground at a rearward inclination to draw the apparatus forward across the ground in response to rotation of said crankshaft means.

2. The invention according to claim 1 wherein said guide means comprises an elongated handle connected to and extending rearwardly from said support means, said handle being manually movable for guiding said apparatus and for tilting said apparatus relative to said axle to control the impingement of said ground working tools on the ground.

3. The invention according to claim 1 wherein said tool supporting end comprises tool holding means for selectively receiving and releasing said ground working tools, said tools being removable from and adjustable in said tool holding means.

4. The invention according to claim 3 wherein said ground working tools comprise tines each having a shank engageable by said tool holding means.

5. A ground working apparatus as set forth in claim 4 wherein each tine has a generally cylindrical form, with a flat extending from said shank to the distal end of said tine and tapering inwardly in the direction of said distal end, the flats of all of said tines facing generally rearwardly with respect to the direction of apparatus movement.

6. The invention as set forth in claim 4 wherein each said tine comprises a flat extending from said shank to the distal end of said tine.

7. The invention according to claim 1 wherein said web means are angled to further space crankpins lengthwise of the axis of rotation of said crankshaft means to maintain the spacing of said ground working tools.

8. The invention according to claim 7 and further including spacer means disposed on said axle for spacing said link means apart from each other to cooperate with said web means in maintaining the spacing of said ground working tools.

9. The invention according to claim 1 wherein said web means support said crankpins at equal radial distances from the axis of rotation of said crankshaft means and at equal angular distances from each other.

10. A ground working apparatus as set forth in claim 1 wherein each ground working tool comprises a chisel edge for chipping and breaking a hard surface.

11. A ground working apparatus as set forth in claim 1 wherein said wheels comprise a plurality of harrowing disks.

12. The invention according to claim 1 wherein each of said tool support arms includes a pivot pin mounted in its tool supporting end, and said link means include links each having a forwardly directed end pivotally engaging one of said pivot pins and a rearwardly directed end pivotally engaging said axle.

* * * * *